June 1, 1926.

C. LE R. LEWIS

STERILIZING AND RINSING APPARATUS

Filed June 9, 1925

Claude LeRoy Lewis, INVENTOR.

BY

Geo. F. Kimmel, ATTORNEY.

June 1, 1926.
C. LE R. LEWIS
1,587,386
STERILIZING AND RINSING APPARATUS
Filed June 9, 1925   2 Sheets-Sheet 2
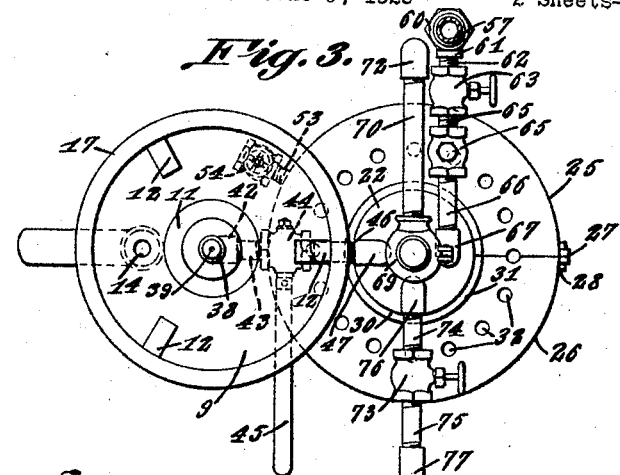
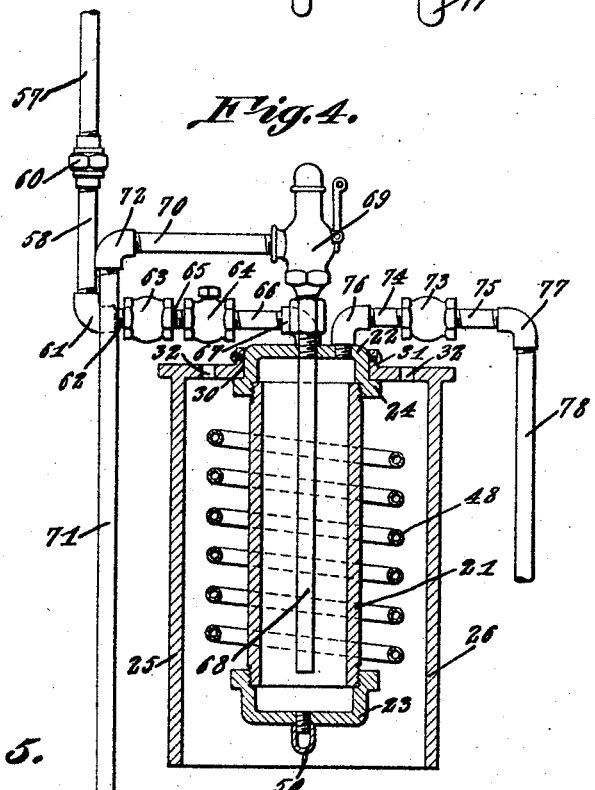
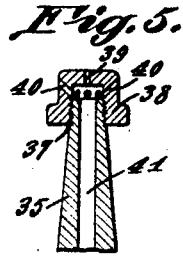
Claude LeRoy Lewis INVENTOR.
BY
Geo. P. Kimmel ATTORNEY.

Patented June 1, 1926.

1,587,386

UNITED STATES PATENT OFFICE.

CLAUDE LE ROY LEWIS, OF OMAHA, NEBRASKA, ASSIGNOR OF ONE-THIRD TO G. W. STREET AND ONE-THIRD TO JOHN A. WALKER, BOTH OF OMAHA, NEBRASKA.

STERILIZING AND RINSING APPARATUS.

Application filed June 9, 1925. Serial No. 35,949.

This invention relates to a sterilizing and rinsing apparatus designed primarily for use for cream and milk cans as well as the lids thereof, but it is to be understood that an apparatus, in accordance with this invention can be employed for sterilizing and rinsing any type of container, as well as the lid thereof for which it is found applicable, and the invention has for its object to provide, in a manner as hereinafter set forth, an apparatus of the class referred to, with means for efficiently sterilizing and rinsing containers as well as the lids thereof with water above the boiling point at atmospheric pressure.

A further object of the invention is to provide, in a manner as hereinafter set forth, a sterilizing and rinsing apparatus which will require a minimum of manual effort, time and labor, as well as providing an apparatus of such class, which is simple in its construction and arrangement, strong, durable, compact, thoroughly efficient and convenient in its use, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that such changes, variations and modifications can be resorted to which come within the scope of the claims hereunto appended.

In the drawings wherein like reference characters denote corresponding parts throughout the several views:—

Figure 3 is a top plan view of the apparatus.

Figure 4 is a section on line 4—4, Figure 2.

Figure 5 is a fragmentary view, in vertical section, of the nozzle.

Figures 1, 2:
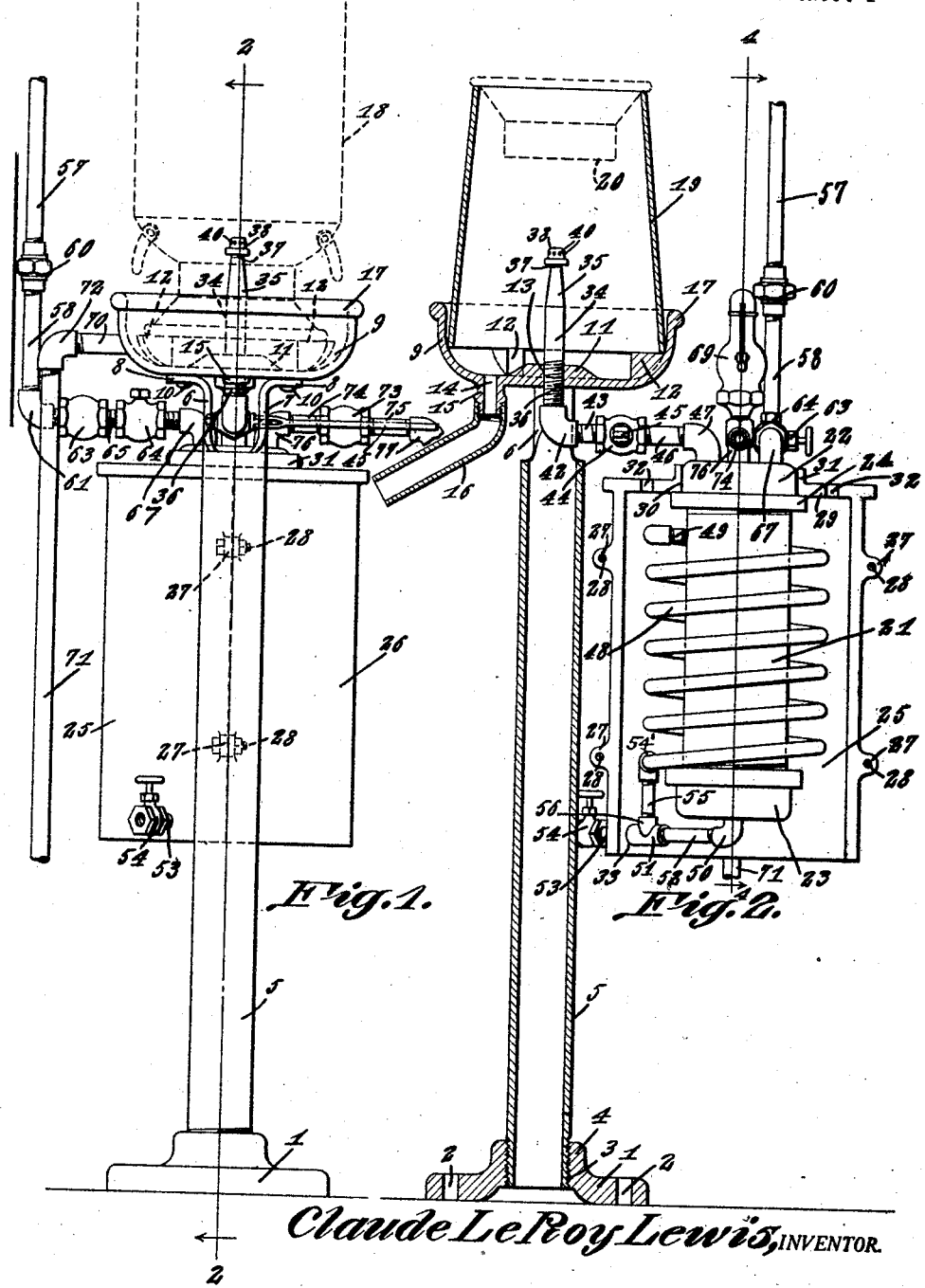
Figure 1 is a side elevation of a sterilizing and rinsing apparatus, in accordance with this invention, showing a milk can in dotted lines, arranged in position to be sterilized and rinsed.
Figure 2 is a section on line 2—2, Figure 1, and further showing a can lid support and a can lid, in dotted lines, in position to be acted upon.

Referring to the drawings in detail, 1 denotes a base which may be termed a floor plate, and is formed with apertures 2 for the passage of holdfast devices to fixedly secure the base to the floor or other support. The base 1 is provided with a centrally disposed opening 3 having a threaded wall and further formed with a vertically disposed interiorly threaded collar 4, having the threads thereof forming a continuation of the threads of the wall of the opening 3. Secured to the base 1 is a tubular standard 5 provided with peripheral threads at its lower terminal portion for engagement with the threads on the wall of the opening 3 and the internal threads of the collar 4. The upper terminal portion of the standard 5 is bifurcated to provide a pair of arms 6, 7, each having the upper portion thereof bent outwardly at right angles, as at 8, to provide what may be termed a pair of supporting flanges upon which is mounted a drain bowl 9. Holdfast devices 10 are employed for fixedly securing the bowl 9 to the flanges 8.

The bowl 9 is of substantial height and centrally of the upper face of the bottom thereof a bevelled boss 11 is formed, and integral with the inner face of the body of the bowl is a series of inwardly extending radially disposed supporting lugs 12 of triangular contour and which are spaced from the boss 11. The lugs 12 are also integral with the upper face of the bottom of the bowl and preferably said lugs 12 are of a height less than half the height of the bowl 9. Formed centrally of the bottom of the bowl 9, as well as extending through the boss 11, is a vertical opening 13 having the wall thereof threaded. The bottom 12, adjacent the boss 11, is formed with a discharge or drain opening 14 with which communicates a depending integral nipple 15, having suitably connected therewith a discharge pipe 16. The bowl 9, at the top edge thereof, is formed with a reinforcing bead 17.

The lugs 12 provide supports for the container which is to be sterilized and rinsed, and as illustrated by way of example in Figure 1, in dotted lines, the lugs 12 support a milk can 18, which is in an inverted position. The neck of the can is mounted on the lugs 12. The lugs 12 also provide means for supporting a lid holder 19, as shown in Figure 2, and said holder is in the form of a tapered casing, open at each end and which is adapted to support a lid or cover to be acted upon by the machine. The lid or cover is illustrated in dotted lines and indicated at 20.

Positioned in proximity to the standard 5, as well as disposed in parallelism with respect thereto, is a water tank of less height than the height of the standard 5. The water tank comprises a tubular body portion 21 of the desired height and diameter having attached to its upper end a head cap 22 and to its lower end a bottom cap 23. The lower portion of the cap 22 is provided with a laterally extending annular flange 24 providing a support for a sectional enclosing jacket for the water tank. The jacket is formed of two semi-circular sections 25, 26, having their end edges abutting each other. Each of said sections has each of its end edges formed with a plurality of laterally extending spaced apertured lugs 27. The lugs of the section 25 abut against the lugs of the section 26, and extending through the abutting lugs are holdfast devices 28 for detachably connecting the sections together. The section 25 as well as the section 26 has formed integral with the top thereof a segmental plate 29 which extends inwardly. The plates 29 of said sections are oppositely disposed with respect to each other and each has its inner edge formed with a semi-circular cutout portion 30. When the sections 25 and 26 are in abutting engagement the cutout portions 30 of the plates 29 provide a circular opening through which extends upwardly the top or head cap 22. When the sections 25 and 26 are in abutting engagement, the jacket is supported from the flange 24 as the plates 29 extend onto said flange 24, and this arrangement is obtained in view of the fact that the opening formed by the cutout portions 30 is of less diameter than the outer diameter of the flange 24. Formed integral with each of the plates 29 as well as extending upwardly therefrom, is a semi-circular flange 31 having its inner face forming a continuation of the wall of the cutout portion 30. The flanges 31 surround the head or top cap 22. Each of the plates 29 is furthermore provided with a series of spaced vent openings 32. The section 25 of the jacket, near its bottom edge, is provided with an opening 33 for a purpose to be presently referred to. The caps 22 and 23 have threaded engagement with the body portion 21.

Extending upwardly through the opening 13 and of a length to project above the top of the bowl 9 is a spray nozzle consisting of a tubular body portion formed of a cylindrical lower part 34 and a tapered upper part 35. The lower part 34 is of greater length than the upper part 35 and said lower part is peripherally threaded as at 36 for engagement with the threads of the wall of the opening 13. The lower part 34 of the nozzle depends a substantial distance below the bowl 9. The upper part 35 of the nozzle body is peripherally threaded, as at 37, and engaging therewith is an interiorly threaded flanged head 38 which extends a substantial distance above the upper end of the part 35 and is of inverted cup shape. The head 38 is formed with a vertical port 39 and a series of upwardly inclined ports 40. The water passage 41 formed in the nozzle body is of materially greater diameter than the diameter of any of the ports formed in the head 38. Threadedly engaging with the lower end of the part 36 of the nozzle body is an elbow 42, which is connected to a nipple 43 extended from a controlling valve 44 of the whistle type. An operating lever 45 is provided for the stem of the valve 44 and said lever 45, more clearly shown in Figure 3, is disposed laterally at right angles with respect to the nipple 43. Extended from the valve 44 is a nipple 46 attached to an elbow 47, which opens into the water tank through the head cap 22, the latter being provided with a suitable opening for connecting the nipple 47 therewith.

Surrounding the body portion 21 of the water tank, as well as spaced from the sections 25 and 26 of the jacket, is a heating coil 48, having its upper end communicating with the water tank below the cap 22 through the medium of a nipple 49. Depending from the cap 23 as well as communicating therewith is an elbow 50 connected with an inverted T coupling 51 by a pipe branch 52. Attached to the coupling 51 and extending through the opening 33 is a nipple 53, which is secured to a drain valve 54. Attached to the lower end of the coil 48 is a depending elbow 54', which is connected by a vertically disposed branch pipe 55, with the vertical leg 56 of the coupling 51.

Leading to the water tank for the purpose of supplying water thereto, is a feed line comprising a pair of vertically disposed branch pipes 57, 58, connected by a union 60. The lower end of the pipe 58 is provided with an elbow 61 from which extends a nipple 62 opening into a controlling valve 63. Extending from the valve 63 to a check valve 64 is a nipple 65. Projecting from the check valve 64 is a pipe branch 66, having attached thereto a depending elbow 67, which extends through the head cap 22 and is provided with a vertically disposed water inlet pipe 68, which extends to a point in proximity to the bottom cap 23 of the water tank.

Connected to the head cap 22 of the water tank, as well as communicating with the interior of the latter, is a safety valve 69 having leading therefrom a discharge line comprising a pair of pipe branches 70, 71 connected together by an elbow 72.

Communicating with the water tank is a hot water discharge line for supplying hot water for any desired purposes, and said line comprises a globe valve 73 having a pair of oppositely extending nipples 74, 75, connected therewith. The nipple 74 is attached to an elbow 76, which is secured to the cap 22 and communicates with the water tank. The nipple 75 has an elbow 77 connected therewith and which is connected to a pipe branch 78.

The elbow 42, nipple 43, controlling valve 45, pipe branch 46 and elbow 47 provide a hot water supply line for the nozzle.

The apparatus is to be used at near the boiling point of the city water pressure, for example if the city pressure is at 100, the boiling point is 337° Fahr. and the water can be heated and used at about 300° Fahr. The water is heated by an oil stove or other suitable means positioned under the jacket enclosing the water tank.

After a container is dumped, it is placed on the drain bowl and the lever 45 is pressed downwardly for a few seconds, which opens the feed to the nozzle and the water rinses the cream or milk into the drain bowl and from there it is conducted into a receiving receptacle. The can is then taken to a wash tank and washed and then positioned on the drain bowl and sterilized by flushing several seconds or until the can is very hot. The water from the drain bowl is conducted to a sewer or other collecting means by changing the position of the discharge or drain pipe 16.

The valve 69 is provided to prevent the pressure from rising above a predetermined point. The check valve 63 is to prevent water being forced back into the supply line when pressure in the supply line is reduced by opening the valve somewhere, causing the water in the tank to change to steam due to reduced pressure. The valve 73 is provided for drawing off hot water for any desirable purposes.

What I claim is:—

1. In an apparatus for the purpose set forth comprising a vertically disposed standard provided at its upper end with a pair of oppositely disposed arms each including a vertical and a horizontal leg, a drain bowl mounted on and secured to said horizontally disposed legs and provided therein with integral, radially disposed spaced means for supporting the article to be acted on, a spray nozzle secured to the bottom of the bowl axially thereof and of a length to project above the bowl and depend below the bottom of the latter between the vertical legs of said arms, and a valve controlled hot water conducting line connected to said nozzle between said arms and including an operating lever for the valve thereof.

2. In an apparatus for the purpose set forth, an annular drain bowl provided centrally of the upper face of its bottom with an integral bevelled boss, a series of supporting lugs integral with the inner face of the side and the upper face of the bottom of said bowl, said lugs being of less height than the height of the bowl and spaced from said bevelled boss, and said bottom further provided with a drain opening adjacent said boss, and a vertically disposed nozzle extending through said bottom and boss and threadedly engaging therewith, said nozzle being positioned axially of the drain bowl and depending a substantial distance therebelow, and a valve controlled hot water conducting line connected to the lower end of the nozzle and provided with an operating lever for the valve thereof.

3. An apparatus for the purpose set forth comprising a base, a tubular standard threadedly engaging therewith and bifurcated at its upper end to provide a pair of arms, a drain bowl secured to said arms and provided therein with radially disposed means for supporting the article to be acted on, a spray nozzle secured to the bottom of the bowl axially thereof and extending above and depending below said bottom, said bottom being provided with a drain opening, a discharge pipe communicating with said opening, and a valve controlled hot water conducting line extending between said arms and connected to the lower end of the nozzle and provided with a laterally extending lever for operating the valve thereof.

4. In an apparatus for the purpose set forth, a drain bowl provided with a drain opening, said bowl further being provided therein with a plurality of spaced integral lugs extended from the inner face of the side thereof and terminating at points removed from the axis of the bottom of the bowl, said lugs being of materially less height than the height of the bowl and providing means for supporting the article to be acted on, a vertically disposed nozzle threadedly engaging with the bottom of the bowl axially thereof and extended above the top edge of the bowl and further depending a substantial distance above the bottom of the bowl, and a water supply line connected to the lower end of the nozzle and including a controlling valve, and a laterally disposed lever for operating the valve.

In testimony whereof, I affix my signature.

CLAUDE LE ROY LEWIS.